United States Patent Office 3,784,695
Patented Jan. 8, 1974

3,784,695
PRODUCTION OF AN HYPOTENSIVE EFFECT
WITH ESTERS OF GALLIC ACID
William D. Cash, Riverside, Conn., assignor to Ciba-
Geigy Corporation, Ardsley, N.Y.
No Drawing. Filed May 27, 1971, Ser. No. 147,695
Int. Cl. A61k 27/00
U.S. Cl. 424—308         2 Claims

ABSTRACT OF THE DISCLOSURE

Method for producing an hypotensive effect and hypotensive agents containing as active compound a gallic acid ester. An illustrative embodiment of the active compound is butyl gallate.

BACKGROUND OF THE INVENTION

Field of the invention

The present invention relates to a method for lowering blood pressure in warm-blooded animals, and to compositions useful for this purpose. The compositions comprise a compound of the formula

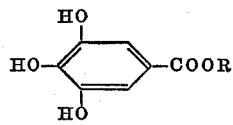

wherein R is lower alkyl and a pharmaceutical carrier.

Description of the prior art

The synthesis of gallic esters have been been described in the literature by several authors; e.g. by W. Will, Ber. 21, 2022 (1888); H. Meyer, Monatsh, 19, 594; Chem. Fabr. "Naarden" Dutch Pat. 66,611; A. Russel and W. G. Tebbens, J.A.C.S. 64 2274–6 (1942); W. G. Christiansen, J.A.C.S. 48, 1361 (1926). Gallic acid esters, especially propylgallate, have found use as food additives because of their anti-oxidant activity [D. L. Bucher, Fishery Market News, 7, 17–19 (1945)] and low toxicity [A. J. Lehman, O. G. Fitzhugh, A. A. Nelson and G. Woodward, Advances in Food Research, 3, 197 (1951); G. J. van Esch. Voeding, 16, 683–6 (1955)]. The fact that methyl and isopropyl-gallate inhibit the action of the enzyme catechol-o-methyl transferase (COMT) has been described by S. B. Ross and O. Haljasmaa, Acta pharmacol et toxicol., 21, 205–14 (1964). M. R. R. Rao and H. H. Siddiqui, Indian J. Exptl. Biol., 2, 29 (1964) showed that ethylgallate (phyllemblin) markedly depressed the motor activity of mice and rats, potentiated the action of adrenalin on the blood pressure of cats, on the isolated frog heart, on the nictitating membrane of cats and prolonged the hypnosis induced by Nembutal. U.S. Pat. No. 3,462,534 describes psychotherapeutic, specifically antidepressant properties, for alkyl gallates and gallacetol. None of the references teaches or suggests that the compounds have hypotensive activity.

DETAILED DESCRIPTION OF THE INVENTION

The advantages of the present invention are attained by providing compositions exhibiting pharmacelogically valuable properties in warm-blooded animals, especially mammals. The new compositions contain as active ingredient an alkyl gallate of the formula

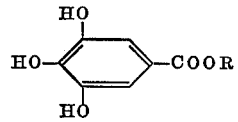

wherein R is lower alkyl.

By the term "lower alkyl" is intended a group comprising a straight or branched hydrocarbon chain containing from 1 to about 9 carbon atoms. Illustrative of such alkyl groups are methyl, ethyl, propyl, isopropyl, butyl, isobutyl, pentyl, hexyl, heptyl, oxtyl, nonyl, etc. Preferred alkyl groups are butyl, pentyl, hexyl, and heptyl.

The instant compositions have a remarkably low toxicity; they are odorless. The compounds of the instant invention can be obtained by a simple process of manufacture.

The instant compositions can be used as cardiovascular agents, in particular blood pressure lowering agents, i.e. they can be used to produce a hypotensive or anti-hypertensive effect in mammals. That these alkyl gallates have this utility is very surprising in the light of the teaching in the above-mentioned U.S. Pat. No. 3,462,534 that they inhibit catechol-o-methyl transferase (COMT).

The hypotensive activity of the alkyl gallates was demonstrated by their effect in normotensive rats and spontaneous hypertensive rats according to the following procedure.

Animals

Rats, CFE, male, normotensive, approx. 300 gms.
Rats, male, spontaneous hypertensive, 350–400 gms.

Doses and routes of administration

Normotensive rats—Butyl gallate, 10 mg./ml., was dissolved in water with warming and the warm solution was injected intraperitoneally (i.p.) at a dose of 100 mg./kg.

Spontaneous hypertensive rats—Butyl gallate was suspended in 5% starch and administered orally at a dose of 640 mg./kg. (volume of suspension 4 ml./kg.).

Procedure: Normotensive rats—Under light anesthesia, the rat caudal artery was cannulated with PE-50 polyethylene tubing; a normal saline solution with heparin (10 units per ml.) was used to maintain the cannula patent. The rats were restrained in plastic cages, in a heated, ventilated box at 31°, and allowed to equilibrate for 30 minutes before treatment. Blood pressure was recorded continuously on a Beckman KM Dynograph.

The test compound, butyl gallate, was given i.p. and three rats were used. Maximal changes in pressure produced by the test compound were compared to the pressures observed just prior to the drug injection.

Spontaneous hypertensive rats—The rats were unanesthetized. Blood pressure was measured indirectly using a tail cuff and pneumatic pulse detector. Four animals were used. Each was dosed at zero time and immediately after the 24-hour blood pressure measurement.

Results: Normotensive rats—The results are shown in Table I by way of the mean pressures and the percent change from the mean.

Butyl gallate produced a decrease in blood pressure.

Spontaneous hypertensive rats—The average blood pressures at various times after the initial and 24-hour doses are shown in Table II. It is seen that butyl gallate lowered blood pressure at all times measured. Each measurement was significantly less than the initial blood pressure ($p$ is $\leq 0.05$).

TABLE I

[Mean blood pressure in normotensive rats following the administration of butyl gallate]

| Control pressure | Lowest blood pressure posttreatment | Maximum change |
|---|---|---|
| 135 | 120 | −11 |
| 138 | 98 | −29 |
| 113 | 93 | −18 |

TABLE II

[Mean blood pressure in the hypertensive rat following the administration of butyl gallate (each value represents the mean of four rats)]

| | Time (hrs.) | Blood pressure, mm./Hg |
|---|---|---|
| Day 1 | [1] 0 | 205 |
| | ½ | 188 |
| | 1 | 178 |
| | 2 | 185 |
| | 3 | 177 |
| | 4 | 182 |
| | 5 | 176 |
| | [1] 24 | 185 |
| Day 2 | ½ | 184 |
| | 1 | 172 |
| | 2 | 178 |
| | 3 | 182 |
| | 4 | 179 |
| | 5 | 183 |
| | 24 | 186 |

[1] Animals dosed immediately after these readings.

Depending on the nature of the specific condition, the presently claimed compositions may be used in conjunction with the administration of other therapeutic agents. Thus, for example, the compounds described herein may be combined with aspirin, caffein, phenacetin, amphetamine or other hypotensive agents like, for instance.

While the compounds of the above-indicated formula may be administered via any of the usual routes, e.g. the oral, parenteral, topical, rectal routes or the like, the preferred one is the oral route.

For such administration, the incorporation of a pharmaceutical carrier for the formation of a pharmaceutical composition is highly desirable. Such compositions used to effect anti-depressant activity comprise a pharmaceutically acceptable carrier and a compound of the general formula which are administered according to the method described above in dosage unit forms acceptable for internal administration.

Such suitable compositions include, without limitation, tablets, capsules, powders, solutions, suspensions, sustained release formulations and the like.

To produce dosage units for peroral application, the compositions of this invention may be combined, e.g. with solid pharmaceutically acceptable pulverulent carriers such as lactose, saccharose, sorbitol, mannitol; starches such as potato starch, corn starch or amylopectin also laminaria powder or citrus pulp powder, cellulose derivatives or gelatin, also lubricants such as polyethylene glycols (Carbowaxes) of suitable molecular weights may be added, to press tablets or form coated tablets. The latter are coated for example, with concentrated sugar solutions which can contain e.g. gum arabic, talcum and/or titanium dioxide, or they are coated with lacquer dissolved in easily volatile organic solvents. Dyestuffs can be added to these coatings, for example, to distinguish between different contents of active substance. Hard gelatin capsules contain, for example, granulates of the instant composition with solid pulverulent carriers such as e.g. lactose, saccharose, sorbitol, mannitol and further starches such as potato starch, corn starch or amylopectin, cellulose derivatives or gelatin, as well as stearic acid.

Suppositories containing a compound of the present invention are readily obtained by techniques well known to those skilled in the art of compounding dosage forms. A compound of the present invention is dispersed in a carrier such as cocoa butter and the suppositories formed in the usual way.

The following examples are given by way of illustrating the process for the preparation of the compositions without limiting the scope thereof in any way.

EXAMPLE I

Manufacture of tablets 10 g. of butyl gallate, 5.0 g. of highly dispersed silicic acid and 89.1 g. of corn starch are well mixed and the mixture is uniformly moistened with a solution of 5.0 g. of gelatin, 2.0 g. of glycerin and 0.9 g. of sodium metabisulfite in 100 ml. of demineralized water. The resulting mass is granulated through a sieve and dried to a water content of 1.0 to 2.1% (absolute). The dry granulate is mixed with 8.0 g. of potato starch, 1.0 g. of highly dispersed silicic acid, 8.0 g. of talcum, and 1.0 g. of magnesium stearate and the mixture is pressed into 1000 tablets each containing 10 mg. of butyl gallate. In the same, tablets are prepared containing 40 mg. of pentylgallate.

EXAMPLE II

A granulate is prepared by uniformly mixing 2.5 g. of butylgallate with 502.0 g. of potato starch, and then moistening with a solution of 15.0 g. of gelatin and 10.0 g. of glycerin in approximately 100 ml. of demineralized water. This is followed by granulating and drying. This granulate is mixed with 20.0 g. of talcum, 20.0 g. potato starch, 5.0 g. of highly dispersed silicic acid and 3.0 g. of magnesium stearate. In this way 1000 press coated tablets each 25 mg. of butylgallate are produced.

In a similar manner press coated tablets are prepared containing 25 mg. of pentylgallate.

EXAMPLE III

Manufacture of capsules

| Ingredient: | Quantity/capsule, mg. |
|---|---|
| Butylgallate | 25 |
| Corn starch, U.S.P. | 275 |

The ingredients are mixed and introduced into a two-piece hard gelatin No. 1 capsule. One each capsule is administered from two to four times daily to patients suffering from depression.

EXAMPLE IV

Manufacture of hard gelatin capsules 140 g. of heptylgallate are intimately mixed with 135 g. of corn starch. The mixture is then moistened with 65 ml. of a solution consisting of equal parts of dimineralized water and ethanol. The moist mixture is granulated and dried. 10 g. of corn starch and 15 g. of talcum, are then admixed and 1000 hard gelatin capsules are filled each with 300 mg. of this final granulate. Each capsule thus contains 140 mg. of heptylgallate.

In the same manner, capsules are prepared containing butylgallate or pentylgallate.

What is claimed is:

1. A method of producing an hypotensive effect which comprises internally administering to a mammal suffering from high blood pressure a hypotensively effective amount of a compound of the formula

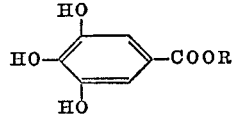

wherein R is lower alkyl.

2. A method in accordance with claim 1 in which the compound administered is butylgallate.

References Cited

UNITED STATES PATENTS 3,462,534   8/1969   Greengard et al.   424—308

OTHER REFERENCES

Chemical Abstracts 73:54236g (1970).

JEROME D. GOLDBERG, Primary Examiner